United States Patent
Oza et al.

(10) Patent No.: US 7,022,302 B2
(45) Date of Patent: Apr. 4, 2006

(54) PROCESS FOR PREPARING HYDROTALCITE AND BRUCITE TYPE POSITE CHARGED LAYERS

(75) Inventors: Pravinchandra M. Oza, Gujarat (IN); Satishbhai H. Mehta, Gujarat (IN); Murnalben V. Sheth, Gujarat (IN); Pushpito K. Ghosh, Gujarat (IN); Mahesh R. Gandhi, Gujarat (IN); Jatin R. Chunawala, Gujarat (IN)

(73) Assignee: Council of Scientific and Industrial Research, New Delhi (IN)

( * ) Notice: Subject to any disclaimer, the term of this patent is extended or adjusted under 35 U.S.C. 154(b) by 604 days.

(21) Appl. No.: 10/334,121

(22) Filed: Dec. 31, 2002

(65) Prior Publication Data

US 2004/0126301 A1 Jul. 1, 2004

(51) Int. Cl.
*C01F 5/00* (2006.01)
*C01F 7/00* (2006.01)

(52) U.S. Cl. .................. 423/420.2; 423/115; 423/122; 423/158

(58) Field of Classification Search ............ 423/420.2, 423/115, 122, 129, 158, 165
See application file for complete search history.

(56) References Cited

U.S. PATENT DOCUMENTS 2,257,544 A 9/1941 Clark
2002/0006375 A1 1/2002 Akira et al.

FOREIGN PATENT DOCUMENTS

WO WO 93 22237 A 11/1993
WO WO 02 079090 A 10/2002

OTHER PUBLICATIONS

Patent Abstracts of Japan, vol. 010, No. 226, Aug. 7, 1986 & JP 61 063526 A, Apr. 1, 1986.
Database WPI, Section Ch, Week 199322, Derwent Publications Ltd., London, GB; Class E33, AN 1993-176262, XP002260918 & CZ 277548 B, Feb. 17, 1993.

*Primary Examiner*—Stanley S. Silverman
*Assistant Examiner*—Peter J. Lish
(74) *Attorney, Agent, or Firm*—Nixon & Vanderhye P.C.

(57) ABSTRACT

An improved process is described for the preparation of surface modified hydrotalcite. The process comprises reacting a precursor of magnesium and aluminium in the presence of suitable alkali carbonate at high temperature. The product has a BET surface area of $\leq 20$ m$^2$/gm and average particle size of $\leq 0.5$ μm and is useful as halogen scavenger and fire retardant.

25 Claims, No Drawings

PROCESS FOR PREPARING HYDROTALCITE AND BRUCITE TYPE POSITE CHARGED LAYERS

FIELD OF THE INVENTION

The present invention relates to an improved process for the preparation of hydrotalcite. More particularly, the present invention also relates to brucite type positive charged layers ($Mg_{1-x}Al_x(OH)_2$) and interlayers having labile anions and water molecules. This layer type material finds utility in plastic processes wherein it deactivates the residual quantities of acidic substances associated with Ziegler-Natta reactions and other acid catalysts used in producing polymers. It finds application in pharmaceutical formulation as antacid. Other applications include (i) base or support catalysts, (ii) adsorbent for wastewater treatment, (iii) as stabilizer in poly-vinyl chloride and (iv) as fire retardant.

BACKGROUND OF THE INVENTION

Zikmund M. et al. in Czech Patent No. 277548 B6 disclose preparation of hydrotalcite by reaction of (i) an aqueous solution of an aluminate of alkaline metal with (ii) solid magnesium compounds viz barrigtonite ($MgCO_3.2H_2O$), nesquehonite ($MgCO_3.3H_2O$), lansfordite ($MgCO_3.3.5H_2O$) hydromagnesite ($Mg_5(CO_3)_4(OH)_2 4H_2O$) etc., for preparing an intermediate amorphous product which is kept mixed for 4 hrs prior to crystallisation for a period of 5–48 hrs at 50–120° C. Surface area (BET $N_2$) was 29 $m^2$/gm and 18 $m^2$/gm for product crystallized at 115° C. for 8 hrs and at 100° C. for 14 hrs respectively. Average agglomerate particle size of product was <1.0 µm. Drawbacks associated with the process are longer aging time of 4 hrs to get an amorphous intermediate and longer crystallisation time of 14 hrs at 100° C. for product having surface area of (BET $N_2$) <20 $m^2$/gm.

Reichle W. T. in an article "Catalytic reactions by thermally activated synthetic anionic clay minerals" in J. Catalysis 94, 547 (1985) discloses the preparation of hydrotalcite by standard aqueous precipitation and heat crystallisation procedure which imbibe the intercalation of solution of magnesium nitrate, aluminium nitrate, with solution of caustic soda and sodium carbonate. Interaction was completed within 4 hrs with vigorous agitation at temperature below 35° C. A product having surface area (BET $N_2$) and particle size of <20 $m^2$/gm and 1–2 µm respectively was obtained by heat crystallisation at 200° C. for 18 hrs. Drawbacks associated with the above process are longer addition and crystallization time as well as higher temperature under autogeneous pressure. Use of nitrate compounds of magnesium and aluminium is costly and at the same time creates disposal problem of ecologically unsafe waste containing nitrate anions.

Preston B. W. in PCT Application No. 93/03903 describes a process for production of synthetic hydrotalcite by reacting a mixture of magnesium hydroxide, a carbonate source, aluminium trihydrate of average particle size of 2.4 µm, or alkali metal aluminate, under hydrothermal condition at a temperature of 160–200° C. A product having purity of 99% and average particle size at $\leq 2$ µm was obtained by using aluminate solution of low alkali content and molar ratio of magnesium source to bicarbonate in the range of 0.9–1.1. It is disclosed that at temperature below 160° C. the reaction proceeds very slowly and further that at temperature above 200° C. the product is of inferior quality. Drawbacks of the process are: (i) higher temperature of crystallisation (160–200° C.), (ii) critical control of molar ratio of reactant during synthesis. Low ratio of magnesium to bicarbonate results into product containing undesirable dawsonite as an impurity, (iii) sodium aluminate with ratio ($Na_2O/Al_2O_3$) higher than 1.25, results in excess sodium difficult to wash. Moreover, higher ratio gives impurities of dawsonite in hydrotalcite, (iv) use of magnesium hydroxide, a source of magnesium, required longer filtration time, and high consumption of water to make it free from adhering electrolyte, and (v) stringent control of average particle size (<2 µm) of aluminium trihydrate.

OBJECTS OF THE INVENTION

The main object of the present invention is to provide an improved process for the preparation of hydrotalcite, which obviates the above-mentioned drawbacks.

Another object of the present invention is to prepare hydrotalcite using bittern or magnesium chloride, which is cheap, and easily available source of magnesium compound.

Another object of the present invention is to prepare and use easily filterable precursors of magnesium and aluminium without employing caustic soda which gives precipitate that is difficult to wash.

Yet another object of invention is to provide less energy intensive synthesis conditions that yield hydrophobic hydrotalcite having surface area (BET $N_2$) of $\leq 20$ $m^2$/gm, average particle size of $\leq 0.5$ µm. at least 90% (by volume) particles are under 1 µm and free from amorphous as well as crystalline impurities.

SUMMARY OF THE INVENTION

Accordingly the present invention provides a process for the preparation of hydrotalcite which comprises (i) diluting bittern with water to obtain a solution with about 2% (w/v) magnesium ion concentration and clarifying the diluted bittern by treating with equivalent amounts of alum solution and caustic soda solution to precipitate aluminium and magnesium hydroxide in the range of 75–100 ppm and 200–300 ppm respectively;

(ii) separating the sedimented hydroxides and obtaining a clear solution of bittern with a magnesium ion concentration in the range of 0.53–0.90 molar;

(iii) reacting clear bittern obtained in step (ii) above with alkali carbonate while keeping mole ratio of carbonate ions to magnesium ions in the range of 1.1–1.4 to obtain an aqueous slurry of a magnesium precursor;

(iv) reacting a solution of alum or soluble aluminium salts having not more than 100 ppm of iron with alkali carbonate under continuous stirring while keeping mole ratio of carbonate ions to aluminium ions in the range of 1.70–1.95 to obtain an aqueous slurry of aluminium precursor;

(v) separating the two precursors obtained in steps (iii) and (iv) above in the form of cakes, and washing the cakes till washed liquor of magnesium precursor and aluminium precursor show less than 0.1% (w/v) of chloride and sulphate respectively;

(vi) heating well dispersed aqueous slurry of magnesium precursor and adding caustic soda equivalent to 0.90–0.95 of magnesium ion present under continuous stirring;

(vii) maintaining the temperature of slurry obtained in step (vi) and then allowing to cool;

(viii) re-dispersing aluminium precursor in 0.05 molar sodium carbonate solution to obtain an aqueous aluminium slurry;
(ix) adding aqueous aluminium slurry obtained in step (viii) to a magnesium slurry obtained in step (vii) keeping ratio of mole of aluminium ions to total moles of aluminium and magnesium ions in the range of 0.28–0.33 under continuing agitation;
(x) crystallizing mixed slurry of 3–5% (w/v on product basis) under agitation and cooling;
(xi) adding stearic acid of 3–6% (w/w on product basis) to a slurry obtained in step (x) with continuous stirring;
(xii) agitating the slurry obtained in step (xi) while allowing to cool, filtering the slurry and washing the cake till filtrate indicated pH of 8.5 to 10.5;
(xiii) drying the said wet cake and pulverizing to obtain hydrophobic hydrotalcite in powder form.

In one embodiment of the invention, the bittern is sea bittern.

In another embodiment of the invention, the bittern is chosen from a bittern having a density in the range of 29–36° Baume and a magnesium concentration in the range of 1.3–4.2 molar.

In a further embodiment of the invention, the bittern has a composition comprising of NaCl 20–2%, $MgCl_2$ 8–35%, $MgSO_4$ 5–7%, and KCl 1.9–1.5% (w/v).

In another embodiment of the invention, step (iii) is carried out at ambient temperature and in a time period in the range of 30–60 minutes.

In another embodiment of the invention, step (iv) is carried out for a time period of about 30 minutes.

In another embodiment of the invention, in step (v) the two precursors are separated by filtration.

In yet another embodiment of the invention, heating in step (vi) is carried out at a temperature in the range of 60–70° C. and caustic soda equivalent to 0.90–0.95 of magnesium ion present is added over a time period in the range of about 15 minutes under continuous stirring.

In yet another embodiment, in step (vii) the temperature of the slurry obtained in step (vi) is maintained at a temperature in the range of to 60–70° C. for 15 minutes and then allowing to cool to about 40° C.

In another embodiment of the invention, in step (ix) the aluminium precursor redispersed in 0.05 molar sodium carbonate solution in step (viii) is added to the magnesium slurry obtained in step (vii) in 30 minutes and agitation continued for about 30 minutes.

In yet another embodiment of the invention, in step (x) the mixed slurry of 3–5% (w/v on product basis) is crystallized at a temperature in the range of 140–150° C. for a period in the range of 4–5 hrs under agitation and then cooled to a temperature of about 80° C.

In another embodiment of invention after crystallisation, in step (xi) stearic acid is added at a temperature in the range of 70 to 90° C., and stirred continuously till temperature of slurry is in the range of 45 to 65° C.

In another embodiment of the invention, in step (xii) the mixed slurry obtained in step (xi) is agitated while allowing to cool to about 55° C. and then filtered at a temperature of about 40° C.

In yet another embodiment of the invention, the wet cake is dried in step (xiii) at a temperature of about 110° C.

In another embodiment of invention, the source of aluminium is selected from the group comprising of commercially available non-ferric alum (aluminium sulfate) and soluble aluminium salts having not more than 100 ppm of iron.

In yet another embodiment of the invention, the concentration of aluminium ions in step (iv) is in the range of 0.20–0.45 molar.

In another embodiment of the invention, the magnesium precursor obtained in step (iii) is further aged for a time period in the range of 10 to 30 minutes under stirring.

In another embodiment of the invention, in step (v), both wet cakes of the precursors are dispersed in demineralised water and slurry of magnesium precursor is heated in step (vi) to 70° C. and temperature of slurry maintained for further 15 minutes.

In another embodiment of the invention, the aluminium slurry is added in step (ix) to magnesium slurry obtained in step (vii) at a temperature below 45° C. prior to crystallisation.

In yet another embodiment of the invention, the surface modified hydrotalcite slurry is filtered and washed till the pH of washing is about 10 and is dried at 10° C.

Surface area (BET $N_2$) of product, activated at 200° C. for 1 hr showed $\leq$20 $m^2$/gm, average particle size (by volume) of around $\leq$0.5 μm, at least 90% particles are under 1 μm, and free from amorphous as well as crystalline impurities as judged from IR and XRD.

The present invention also provides an improved process for the preparation of hydrotalcite which comprises, (i) diluting sea bittern with water to obtain a solution with nearly 2% (w/v) magnesium ion concentration and clarifying the bittern by treating with equivalent amount of alum solution and caustic soda solution to precipitate aluminium and magnesium hydroxide in the range of 75–100 ppm and 200–300 ppm respectively: (ii) separating the sedimented hydroxides and obtaining a clear solution of bittern having magnesium ions concentration in the range of 0.53–0.90 molar; (iii) preparing an aqueous slurry of magnesium precursor by reacting clear bittern obtained in (ii) with alkali carbonate while keeping mole ratio of carbonate ions to magnesium ions in the range of 1.1–1.4 at ambient temperature in stipulated time range of 30–60 minutes; (iv) preparing an aqueous slurry of aluminium precursor by reacting a solution of alum or soluble aluminium salts having not more than 100 ppm of iron with alkali carbonate in 30 minutes under continuous stirring while keeping mole ratio of carbonate ions to aluminium ions in the range of 1.70–1.95; (v) separating two precursors obtained in (iii) and (iv) by filtration, and washing the cakes till washed liquor of magnesium precursor and aluminium precursor showed less than 0.1% (w/v) of chloride and sulphate, respectively; (vi) heating well dispersed aqueous slurry of magnesium precursor to 60–70° C. and adding caustic soda equivalent to 0.90–0.95 of magnesium ion present, in 15 minutes time under continuous stirring; (vii) maintaining the temperature of slurry obtained in (vi) to 60–70° C. for 15 minutes and allowing to cool to nearly 40° C.; (viii) re-dispersing aluminium precursor in 0.05 molar sodium carbonate solution; (ix) adding aqueous aluminium slurry obtained in (viii) to a magnesium slurry obtained in (vii) in 30 minutes keeping ratio of mole of aluminium ions to total moles of aluminium and magnesium ions in the range of 0.28–0.33 and continuing agitation for 30 minutes; (x) crystallizing mixed slurry of 3–5% (w/v on product basis) in the temperature range of 140–150° C. for 4–5 hrs under agitation and cooling to 80° C.; (xi) adding stearic acid of 3–6% (w/w on product basis) to a slurry obtained in (x) with continuous stirring; (xii) agitating the slurry obtained in (xi) while allowing to cool to nearly 55° C., filtering the slurry at nearly 40° C. and washing the cake till filtrate indicated pH of 10; (xiii) drying the said wet cake at 110+ C. and pulverizing to obtain hydrophobic hydrotalcite in powder form.

DETAILED DESCRIPTION OF THE INVENTION

Synthetic hydrotalcite are generally used as a halogen scavenger in plastic processes has a mole ratio of aluminium to magnesium of 1:2. Hydrotalcite is a crystalline material, free from minor phases like magnesium hydroxy carbonate, magnesium carbonate. X-ray diffraction of hydrotalcite exhibits six major diffraction bands at around 7.76, 3.89, 2.59, 2.30, 1.53 and 1.50 A°. Because of its very fine particle size (Average of 0.5 µm by volume) low surface area (<20 m²/gm), high anion exchange capacity and high compatibility, the surface modified hydrotalcite find application in polymer processes.

The bittern, which is useful in practice of the invention, is obtained by solar evaporation of seawater and generally has a density in the range of 29–36° Baume. This bittern is a byproduct of a solar salt industry and is a rich source of magnesium. A typical sea bittern having a density of 29–36° Baume has composition: NaCl 20–2%, $MgCl_2$ 8–35%, $MgSO_4$ 5–7%, and KCl 1.9–1.5% (w/v). The bittern has magnesium concentration in the range of 1.3–4.2 molar. In addition to sea bittern mentioned above, we have found that bittern having different anions in chemical composition are also useful in the preparation of hydrotalcite provided that it possesses (i) a density in the range of 29–36° Baume, (ii) magnesium concentration in the range of 1.3–4.2 molar, and (iii) solution is free from suspended impurities. The sea bittern has varying proportion of cations and anions as shown above depending on source of bittern. The other ingredients used in the practice of this invention is non-ferric alum containing aluminium oxide ($Al_2O_3$) in the range of 16–18% (w/w) and iron content of less than 100 ppm. The sodium carbonate and caustic soda used were of chemical grade having high purity of not less than 95%.

In the process bittern of 29–36° "Baume is diluted with water to get magnesium ions concentration of about 2% (w/v). The diluted bittern is then treated with solution of non-ferric aluminium sulphate and caustic soda. The concentrations of these solutions are (i) 1–2.2% $Al_2O_3$(w/v), and (ii) 1–2 N NaOH. The precipitate of hydroxide of aluminium in the range of 75–100 ppm and hydroxide of magnesium in the range of 200–300 ppm are obtained by this treatment. The precipitates are then allowed to settle to get clear bittern containing about 2% (w/v) magnesium ions. The clarified bittern is interacted with solution of alkali carbonate to obtain magnesium precursor. The quantity of a molar concentration of alkali carbonate is adjusted to obtain mole ratio of carbonate to magnesium ion in the range of 1.1–1.4. The solutions are reacted for 45 minutes with stirring at ambient temperature and further homogenized for 15 minutes. Similarly the precursor of aluminium is prepared by reacting solution of non-ferric alum containing 1.0–2.2% (w/v) $Al_2O_3$, with solution of alkali carbonate of a molar concentration. The quantity of alkali carbonate is adjusted to obtain mole ratio of carbonate to aluminium ions in the range of 1.70–1.95. The solutions are reacted for 30 minutes and further homogenized for 5 minutes at ambient temperature. Both the precursors are filtered separately by known filtration methods and washing the cakes till nearly free from chloride and sulphate ions. The magnesium precursor is then redispersed in demineralised water and heated to 60–70° C. The quantity of caustic soda solution added in 15 minutes is 0.90–0.95 equivalent of magnesium ions present. It was then allowed to cool to nearly 45° C.

The aluminium precursor is redispersed in 0.05 molar sodium carbonate solution. This redispersed slurry of aluminium is added in 30 minutes to a redispersed slurry of magnesium. The mixed precursors are then further stirred for 30 minutes. The mole fraction of aluminium calculated as ratio of mole of aluminium ions to total moles of aluminium and magnesium ions in this mixed slurry was kept in the range of 0.28–0.33. The slurry containing 3–5% solid (w/v) is heat crystallized at 140–150° C. for 4–5 hrs under agitation in an autoclave and then cooled to 80° C. Hydrotalcite thus crystallized was then surface modified by adding while stirring 3–6% stearic acid based on weight of final product. The slurry was continuously stirred till the temperature reached to 55° C. Surface modified product was filtered around 40° C. and washed till filtrate indicated pH of around 10. The cake so obtained is dried at 110° C. and pulverized to obtain product in powder form.

The hydrotalcite is characterized by (i) powder x-ray diffraction in the range of 5–70° 2θ with Cu K α radiation, (ii) IR spectrophotometer in the range of 4000–400 $cm^{-1}$ using KBr pellet technique, (iii) surface area by BET ($N_2$-adsorption) of 200° C., 1 hr activate sample, (iv) particle size (vol. %) by laser diffraction method of a wet slurry.

In the present invention, hydrotalcite of low surface area and fine particle size is preferably prepared from a homogeneous mixture of (i) magnesium precursor—containing alkali carbonate and sea bittern and (ii) aluminium precursor—containing alkali carbonate and solution of non-ferric aluminium sulphate. The amorphous magnesium aluminium carbonate complex so formed under autogenous pressure is converted to crystalline material. The hydrophilic surface is further treated with organic acid to make it hydrophobic, which makes it compatible with polymers. The inventive steps adopted in this invention are (i) the precursors of magnesium and aluminium are prepared at ambient temperature and obviates the need of elevated temperature (ii) the magnesium and aluminium precursors are easily filtered and it dispenses with the use of magnesium hydroxide which is difficult to filter; (iii) the precursors so prepared could be directly crystallized and does not require any aging period; (iv) the precursors in aqueous slurry form could be crystallized and does not require any prior grinding/homogenization through colloid mill and (v) the precursor so prepared could be crystallized in a shorter period.

Following examples are given by way of illustration and therefore should not be construed to limit the scope of present invention:

EXAMPLE 1

Bittern with a density of 29° Baume containing 20% NaCl, 8.4% $MgCl_2$, 5.4% $MgSO_4$ and 1.8% KCl (w/v) was diluted with water to get magnesium ions concentration of about 2% (w/v). The diluted bittern was then treated with a solution of non-ferric aluminium sulphate containing 1.02% (w/v) $Al_2O_3$ and a solution of 1N caustic soda to precipitate 100 ppm aluminium hydroxide and 300 ppm of magnesium hydroxide. These precipitates were removed by settling. The clarified bittern containing 1.92% (w/v) magnesium ions was obtained. The clarified bittern containing 3.54 mole of magnesium ions was treated for 45 minutes with a molar solution of sodium carbonate with continuous stirring keeping mole ratio of carbonate ions to magnesium ions at 1.15. It was further stirred for 15 minutes at ambient temperature. Similarly a molar solution of sodium carbonate was interacted at ambient temperature for 30 minutes with continuous stirring with 0.725 mole of $Al_2O_3$ from 0.216 molar stock solution of $Al_2O_3$ prepared from non-ferric alum. It was further stirred for 5 minutes. The mole ratio of $CO_3^{2-}/Al^{3+}$ is kept at 1.75. Both the precursors of magnesium and aluminium were then filtered by known filtration method and washing the cake were continued till $Cl^{1-}$ and $SO_4^{2-}$ content of filtrate of precursors reached a value of around 0.1% (w/v). Both the cakes were well dispersed in demineralized water. 4.6 L slurry containing 3.05 mole of magnesium ions was then heated to 70° C. The quantity of caustic soda solution of 2N added in 15 minutes with continuous stirring was 0.95 equivalent of magnesium ions. 3 L slurry of 0.05 molar sodium carbonate solution containing aluminium ions was added within 30 minutes to above magnesium slurry at around 40° C. with vigorous stirring. After further homogenization for 30 minutes, mixed slurry was crystallized with stirring at 145° C. for 4 hr 30 minutes in an autoclave. Stearic acid of 20 gms was mixed with above crystallized slurry of 80° C. and stirred till temperature of around 55° C. is reached. Surface modified product was then filtered around 40° C. and washed till free from adhering electrolytes and filtrate indicated pH of 10. After drying the wet cake at 110° C. and pulverizing, hydrotalcite of −150 mesh was characterized by XRD, IR and particle size. XRD pattern exhibited all the six major diffraction bands indicated absence of crystalline impurities. Similarly absence of amorphous impurities was indicated by IR spectrum. Average particle size (by volume) of product was 0.16 μm, 97% particles are under 1 μm. Surface area of product was 18 m²/gm.

EXAMPLE 2

Bittern with a density of 29° Baume containing 20% NaCl, 8.4% $MgCl_2$, 5.4% $MgSO_4$ and 1.8% KCl (w/v) was diluted with water to get magnesium ions concentration of about 2% (w/v). The diluted bittern was then treated with a solution of non-ferric aluminium sulphate containing 1.02% (w/v) $Al_2O_3$ and a solution of 1N caustic soda to precipitate 100 ppm aluminium hydroxide and 300 ppm of magnesium hydroxide. These precipitates were removed by settling. The clarified bittern containing 1.92% (w/v) magnesium ions was obtained. The clarified bittern containing 3.64 mole of magnesium ions was treated for 45 minutes with a molar solution of sodium carbonate with continuous stirring keeping mole ratio of carbonate ions to magnesium ions at 1.30. It was further stirred for 15 minutes at ambient temperature. Similarly a molar solution of sodium carbonate was interacted at ambient temperature for 30 minutes with continuous stirring with 0.745 mole of $Al_2O_3$ from 0.1 molar stock solution of $Al_2O_3$ prepared from non-ferric alum. It was further stirred for 5 minutes. The mole ratio of $CO_3^{2-}/Al^{3+}$, is kept at 1.85. Both the precursors of magnesium and aluminium were then filtered by known filtration method and washing the cakes continued till $Cl^{1-}$ and $SO_4^{2-}$ content of filtrate of precursors reached a value of around 0.1% (w/v). Both the cakes were well dispersed in demineralized water. 5.0 L slurry containing 3.15 mole of magnesium ions was then heated to 70° C. The quantity of caustic soda solution of 2N added in 15 minutes with continuous stirring was 0.80 equivalent of magnesium ions. 3.2 L slurry of 0.05 molar sodium carbonate solution containing aluminium ions was added within 30 minutes to above magnesium slurry at around 40° C. with vigorous stirring. After further homogenization for 30 minutes, mixed slurry was crystallized with stirring at 145° C. for 5 hr 30 minutes in an autoclave. Stearic acid of 22 gms was mixed with above crystallized slurry of 80° C. and stirred till temperature of around 55° C. is reached. Surface modified product was then filtered around 40° C. and washed till free from adhering electrolytes and filtrate indicated pH of 10. After drying the wet cake at 110° C. and pulverizing, hydrotalcite of −150 mesh was characterized by XRD, IR and particle size. XRD pattern exhibited all the six major diffraction bands and indicated absence of crystalline impurities. Absence of amorphous impurities was indicated by IR spectrum. Average particle size (by volume) of product was 0.18 μm and 85% particles are under 1 μm. Surface area of product was 18 m²/gm.

EXAMPLE 3

Bittern with a density of 29° Baume containing 20% NaCl, 8.4% $MgCl_2$, 5.4% $MgSO_4$ and 1.8% KCl (w/v) was diluted with water to get magnesium ions concentration of about 2% (w/v). The diluted bittern was then treated with a solution of non-ferric aluminium sulphate containing 1.02% (w/v) $Al_2O_3$ and a solution of 1N caustic soda to precipitate 100 ppm aluminium hydroxide and 300 ppm of magnesium hydroxide. This precipitates were removed by settling. The clarified bittern containing 1.92% (w/v) magnesium ions was obtained. The clarified bittern containing 3.54 mole of magnesium ions was treated for 45 minutes with a molar solution of sodium carbonate with continuous stirring keeping mole ratio of carbonate ions to magnesium ions at 1.25. It was further stirred for 15 minutes at ambient temperature. Similarly a molar solution of sodium carbonate was interacted at ambient temperature for 30 minutes with continuous stirring with 0.745 mole of $Al_2O_3$ from 0.15 molar stock solution of $Al_2O_3$ prepared from non-ferric alum. It was further stirred for 5 minutes. The mole ratio of $CO_3^{2-}/Al^{3+}$ is kept at 1.80. Both the precursors of magnesium and aluminium were then filtered by known filtration method and washing the cake were continued till $Cl^{1-}$ and $SO_4^{2-}$ content of filtrate of precursors reached a value of around 0.1% (w/v). Both the cakes were well dispersed in demineralized water. 7.0 L slurry containing 3.2 mole of magnesium ions was then heated to 70° C. The quantity of caustic soda solution of 2N added in 15 minutes with continuous stirring was 0.5 equivalent of magnesium ions. 3.2 L slurry of 0.05 molar sodium carbonate solution containing aluminium ions was added within 30 minutes to above magnesium slurry at around 40° C. with vigorous stirring. After further homogenization for 30 minutes, mixed slurry was crystallized with stirring at 145° C. for 4 hr 30 minutes in an autoclave. Stearic acid of 22 gms was mixed with above crystallized slurry of 80"° C. and stirred till temperature of around 55° C. is reached. Surface modified product was then filtered around 40° C. and washed till free from adhering electrolytes and filtrate indicated pH of 10. After drying the wet cake at 110° C. and pulverizing, hydrotalcite of −150 mesh was characterized by XRD, IR and particle size. XRD pattern exhibited all the six major diffraction bands and indicated absence of crystalline impurities. Similarly absence of amorphous impurities was indicated by IR spectrum. Average particle size (by volume) of product was 0.13 μm and 96% particles are under 1 μm. Surface area of product was 28 m²/gm.

EXAMPLE 4

Bittern with a density of 29° Baume containing 20% NaCl, 8.4% $MgCl_2$, 5.4% $MgSO_4$ and 1.8% KCl (w/v) was diluted with water to get magnesium ions concentration of about 2% (w/v). The diluted bittern was then treated with a solution of non-ferric aluminium sulphate containing 1.02% (w/v) $Al_2O_3$ and a solution of 1N caustic soda to precipitate 100 ppm aluminium hydroxide and 300 ppm of magnesium hydroxide. This precipitates were removed by settling. The clarified bittern containing 1.92% (w/v) magnesium ions was obtained. The clarified bittern containing 61.4 mole of magnesium ions was treated for 45 minutes with a molar solution of sodium carbonate with continuous stirring keeping mole ratio of carbonate ions to magnesium ions at 1.35. It was further stirred for 15 minutes at ambient temperature. Similarly a molar solution of sodium carbonate was interacted at ambient temperature for 30 minutes with continuous stirring with 11.95 mole of $Al_2O_3$ from 0.18 molar stock solution of $Al_2O_3$ prepared from non-ferric alum. It was further stirred for 5 minutes. The mole ratio of $CO_3^{2-}/Al^{3+}$ is kept at 1.85. Both the precursors of magnesium and aluminium were then filtered by known filtration method and washing the cake were continued till $Cl^{1-}$ and $SO_4^{2-}$ content of filtrate of precursors reached a value of around 0.1% (w/v). Both the cakes were well dispersed in demineralized water. 82 L slurry containing 56 mole of magnesium ions was then heated to 70° C. The quantity of caustic soda solution of 2N added in 15 minutes with continuous stirring was 0.90 equivalent of magnesium ions. 45 L slurry of 0.05 molar sodium carbonate solution containing aluminium ions was added within 30 minutes to above magnesium slurry at around 40° C. with vigorous stirring. After further homogenization for 30 minutes, mixed slurry was crystallized with stirring at 145° C. for 5 hrs in an autoclave. Stearic acid of 340 gms was mixed with above crystallized slurry of 80° C. and stirred till temperature of around 55° C. is reached. Surface modified product was then filtered around 40° C. and washed till free from adhering electrolytes and filtrate indicated pH of 10. After drying the wet cake at 110° C. and pulverizing, hydrotalcite of −150 mesh was characterized by XRD, IR and particle size. XRD pattern exhibited all the six major diffraction bands and indicated absence of crystalline impurities. Absence of amorphous impurities was indicated by IR spectrum. Average particle size (by volume) of product was 0.14 μm and 90% particles are under 1 μm. Surface area of product was 12 $m^2/gm$.

EXAMPLE 5

Bittern with a density of 29° Baume containing 20% NaCl, 8.4% $MgCl_2$, 5.4% $MgSO_4$ and 1.8% KCl (w/v) was diluted with water to get magnesium ions concentration of about 2% (w/v). The diluted bittern was then treated with a solution of non-ferric aluminium sulphate containing 1.02% (w/v) $Al_2O_3$ and a solution of 1N caustic soda to precipitate 100 ppm aluminium hydroxide and 300 ppm of magnesium hydroxide. This precipitates were removed by settling. The clarified bittern containing 1.92% (w/v) magnesium ions was obtained. The clarified bittern containing 61.4 mole of magnesium ions was treated for 45 minutes with a molar solution of sodium carbonate with continuous stirring keeping mole ratio of carbonate ions to magnesium ions at 1.35. It was further stirred for 15 minutes at ambient temperature. Similarly a molar solution of sodium carbonate was interacted at ambient temperature for 30 minutes with continuous stirring with 11.95 mole of $Al_2O_3$ from 0.2 molar stock solution of $Al_2O_3$ prepared from non-ferric alum. It was further stirred for 5 minutes. The mole ratio of $CO_3^{2-}/Al^{3+}$ is kept at 1.85. Both the precursors of magnesium and aluminium were then filtered by known filtration method and washing the cake were continued till $Cl^{1-}$ and $SO_4^{2-}$ content of filtrate of precursors reached a value of around 0.1% (w/v). Both the cakes were well dispersed in demineralized water. 82 L slurry containing 56 mole of magnesium ions was then heated to 70° C. The quantity of caustic soda solution of 2N added in 15 minutes with continuous stirring was 0.90 equivalent of magnesium ions. 45 L slurry of 0.05 molar sodium carbonate solution containing aluminium ions was added within 30 minutes to above magnesium slurry at around 40° C. with vigorous stirring. After further homogenization for 30 minutes, 3.5 L mixed slurry was crystallized with stirring at 160° C. for 2 hr 30 minutes in an autoclave. Stearic acid of 9.0 gms was mixed with above crystallized slurry of 80° C. and stirred till temperature of around 55° C. is reached. Surface modified product was then filtered around 40° C. and washed till free from adhering electrolytes and filtrate indicated pH of 10. After drying the wet cake at 110° C. and pulverizing, hydrotalcite of −150 mesh was characterized by XRD, IR and particle size. XRD pattern exhibited all the six major diffraction bands and indicated absence of crystalline impurities. However, presence of amorphous impurities was indicated in the IR spectrum (three small peak in the range 1650–1500 $cm^{-1}$). Average particle size (by volume) of product was 0.13 μm and 94% particles are under 1 μm. Surface area of product was 22 $m^2/gm$.

EXAMPLE 6

Bittern with a density of 29° Baume containing 20% NaCl, 8.4% $MgCl_2$, 5.4% $MgSO_4$ and 1.8% KCl (w/v) was diluted with water to get magnesium ions concentration of about 2% (w/v). The diluted bittern was then treated with a solution of non-ferric aluminium sulphate containing 1.02% (w/v) $Al_2O_3$ and a solution of 1N caustic soda to precipitate 100 ppm aluminium hydroxide and 300 ppm of magnesium hydroxide. This precipitates were removed by settling. The clarified bittern containing 1.92% (w/v) magnesium ions was obtained. The clarified bittern containing 3.40 mole of magnesium ions was treated for 45 minutes with a molar solution of sodium carbonate with continuous stirring keeping mole ratio of carbonate ions to magnesium ions at 1.25. It was further stirred for 15 minutes at ambient temperature. Similarly a molar solution of sodium carbonate was interacted at ambient temperature for 30 minutes with continuous stirring with 0.74 mole of $Al_2O_3$ from 0.185 molar stock solution of $Al_2O_3$ prepared from non-ferric alum. It was further stirred for 5 minutes. The mole ratio of $CO_3^{2-}/Al^{3+}$ is kept at 1.85. Both the precursors of magnesium and aluminium were then filtered by known filtration method and washing the cake were continued till $Cl^{1-}$ and $SO_4^2$ content of filtrate of precursors reached a value of around 0.1% (w/v). Both the cakes were well dispersed in demineralized water. 7.5 L of slurry containing 3.14 mole of magnesium ions was then heated to 70° C. Caustic soda solution was not added 3 L slurry of 0.05 molar sodium carbonate solution containing aluminium ions was added within 30 minutes to above magnesium slurry at around 40° C. with vigorous stirring. After further homogenization for 30 minutes, mixed slurry was crystallized with stirring at 125° C. for 7 hrs in an autoclave. Stearic acid of 10.5 gms was mixed with above crystallized slurry of 80° C. and stirred till temperature of around 55° C. is reached. Surface modified product was then filtered around 40° C. and washed till free from adhering electrolytes and filtrate indicated pH of 10. After drying the wet cake at 110° C. and pulverizing, hydrotalcite of −150 mesh was characterized by XRD, IR and particle size. XRD pattern exhibited all the six major diffraction bands and indicated absence of crystalline impurities. Similarly absence of amorphous impurities was indicated by IR spectrum. Average particle size (by volume) of product was 0.26 μm and 75% particles are under 1 μm. Surface area of product was 30 m$^2$/gm.

EXAMPLE 7

Bittern with a density of 29° Baume containing 20% NaCl, 8.4% MgCl$_2$, 5.4% MgSO$_4$ and 1.8% KCl (w/v) was diluted with water to get magnesium ions concentration of about 2% (w/v). The diluted bittern was then treated with a solution of non-ferric aluminium sulphate containing 1.02% (w/v) Al$_2$O$_3$ and a solution of 1N caustic soda to precipitate 100 ppm aluminium hydroxide and 300 ppm of magnesium hydroxide. This precipitates were removed by settling. The clarified bittern containing 1.92% (w/v) magnesium ions was obtained. The clarified bittern containing 4.21 mole of magnesium ions was treated for 45 minutes with a molar solution of sodium carbonate with continuous stirring keeping mole ratio of carbonate ions to magnesium ions at 1.25. It was further stirred for 15 minutes at ambient temperature. Similarly a molar solution of sodium carbonate was interacted at ambient temperature for 30 minutes with continuous stirring with 0.74 mole of Al$_2$O$_3$ from 0.21 molar stock solution of Al$_2$O$_3$ prepared from non-ferric alum. It was further stirred for 5 minutes. The mole ratio of CO$_3^{2-}$/Al$^{3+}$ is kept at 1.7. Both the precursors of magnesium and aluminium were then filtered by known filtration method and washing the cake were continued till Cl$^{1-}$ and SO$_4^{2-}$ content of filtrate of precursors reached a value of around 0.1% (w/v). Both the cakes were well dispersed in demineralized water. 6 L slurry containing 3.45 mole of magnesium ions was then heated to 70° C. The quantity of caustic soda solution of 2N added in 15 minutes with continuous stirring was 0.80 equivalent of magnesium ions. 2.6 L slurry of 0.05 molar sodium carbonate solution containing aluminium ions was added within 30 minutes to above magnesium slurry at around 40° C. with vigorous stirring. After further homogenization for 30 minutes, mixed slurry was crystallized with stirring at 125° C. for 5 hr 30 minutes in an autoclave. Stearic acid of 14.8 gms was mixed with above crystallized slurry of 80° C. and stirred till temperature of around 55° C. is reached. Surface modified product was then filtered around 40° C. and washed till free from adhering electrolytes and filtrate indicated pH of 10. After drying the wet cake at 110° C. and pulverizing, hydrotalcite of –150 mesh was characterized by XRD, IR and particle size. XRD pattern exhibited all the six major diffraction bands and indicated absence of crystalline impurities. Similarly absence of amorphous impurities was indicated by IR spectrum. Average particle size (by volume) of product was 0.3 μm and 75% particles is under 1 μm. Surface area of product was 24 m$^2$/gm.

The main advantages of the present inventions are:
1. Cheaply and easily available sea bittern and non-ferric alum has been used as a source of magnesium and aluminium compound respectively.
2. The mother liquor after crystallization can be reused.
3. The process does not require costly equipment for drying i.e. spray drier.
4. Product having less surface area ($\leq$20 m$^2$/gm) and fine particle size (average $\leq$0.5 μm., and at least 90% (by volume) particles are under 1 μm) and free from amorphous as well as crystalline impurities, can be obtained with less energy intensive step of 4–5 hrs of heat crystallisation at 140–150° C.

We claim:
1. A process for the preparation of hydrotalcite which comprises,
   (i) diluting bittern with water to obtain a solution with about 2% (w/v) magnesium ion concentration and clarifying the diluted bittern by treating with equivalent amounts of alum solution and caustic soda solution to precipitate aluminium and magnesium hydroxide in the range of 75–100 ppm and 200–300 ppm respectively;
   (ii) separating the sedimented hydroxides and obtaining a clear solution of bittern with a magnesium ion concentration in the range of 0.53–0.90 molar;
   (iii) reacting clear bittern obtained in step (ii) above with alkali carbonate while keeping mole ratio of carbonate ions to magnesium ions in the range of 1.1–1.4 to obtain an aqueous slurry of a magnesium precursor;
   (iv) reacting a solution of alum or soluble aluminium salts having not more than 100 ppm of iron with alkali carbonate under continuous stirring while keeping mole ratio of carbonate ions to aluminium ions in the range of 1.70–1.95 to obtain an aqueous slurry of aluminium precursor;
   (v) separating the precursors obtained in steps (iii) and (iv) above in form of cakes, and washing the cakes till washed liquor of magnesium precursor and aluminium precursor show less than 0.1% (w/v) of chloride and sulphate respectively;
   (vi) heating well dispersed aqueous slurry of magnesium precursor and adding caustic soda equivalent to 0.90–0.95 of magnesium ion present under continuous stirring;
   (vii) maintaining the temperature of slurry obtained in step (vi) and then allowing it to cool;
   (viii) re-dispersing aluminium precursor in 0.05 molar sodium carbonate solution to obtain an aqueous aluminium slurry;
   (ix) adding aqueous aluminium slurry obtained in step (viii) to a magnesium slurry obtained in step (vii) keeping ratio of mole of aluminium ions to total moles of aluminium and magnesium ions in the range of 0.28–0.33 under continuing agitation to obtain an amorphous magnesium-aluminium complex;
   (x) crystallizing mixed slurry of 3–5% (w/v on product basis) under agitation and cooling;
   (xi) adding stearic acid of 3–6% (w/v on product basis) to a slurry obtained in step (x) with continuous stirring;
   (xii) agitating the slurry obtained in step (xi) while allowing to cool, filtering the slurry and washing the cake till filtrate indicated pH of 8.5 to 10.5;
   (xiii) drying the said wet cake and pulverizing to obtain hydrophobic hydrotalcite in powder form.
2. A process as claimed in claim 1 wherein the bittern is sea bittern.
3. A process as claimed in claim 1 wherein the bittern is chosen from a bittern having a density in the range of 29–36° Baume and a magnesium concentration in the range of 1.3–4.2 molar.
4. A process as claimed in claim 1 wherein the bittern has a composition comprising of NaCl 20–2%, MgCl$_2$ 8–35%, MgSO$_4$ 5–7%, and KCl 1.9–1.5% (w/v).
5. A process as claimed in claim 1 wherein step (iii) is carried out at ambient temperature and in a time period in the range of 30–60 minutes.

6. A process as claimed in claim 1 wherein step (iv) is carried out for a time period of about 30 minutes.

7. A process as claimed in claim 1 wherein in step (v) the two precursors are separated by filtration.

8. A process as claimed in claim 1 wherein heating in step (vi) is carried out at a temperature in the range of 60–70° C. and caustic soda equivalent to 0.90–0.95 of magnesium ion present is added over a time period in the range of about 15 minutes.

9. A process as claimed in claim 1 wherein in step (vii) the temperature of the slurry obtained in step (vi) is maintained at a temperature in the range of to 60–70° C. for 15 minutes and then allowed to cool to about 40° C.

10. A process as claimed in claim 1 wherein in step (ix) the redispersed aluminium precursor is added to the magnesium slurry obtained in step (vii) in 30 minutes and agitation continued for about 30 minutes.

11. A process as claimed in claim 1 wherein in step (x) the mixed slurry of 3–5% (w/v on product basis) is crystallized at a temperature in the range of 140–150° C. for a period in the range of 4–5 hrs under agitation and then cooled to a temperature of about 80° C.

12. A process as claimed in claim 1 wherein after crystallisation, in step (xi) stearic acid is added at a temperature in the range of 70 to 90° C., and stirred continuously till temperature of slurry is in the range of 45 to 65° C.

13. A process as claimed in claim 1 wherein in step (xii) the mixed slurry obtained in step (xi) is agitated while allowing to cool to about 55° C. and then filtered at a temperature of about 40° C.

14. A process as claimed in claim 1 wherein the wet cake is dried in step (xiii) at a temperature of about 110° C.

15. A process as claimed in claim 1 wherein the source of aluminium is selected from the group comprising of commercially available non-ferric alum (aluminium sulfate) and soluble aluminium salts having not more than 100 ppm of iron.

16. A process as claimed in claim 1 wherein the concentration of aluminium ions in step (iv) is in the range of 0.20–0.45 molar.

17. A process as claimed in claim 1 wherein the magnesium precursor obtained in step (iii) is further aged for a time period in the range of 10 to 30 minutes under stirring.

18. A process as claimed in claim 1 wherein in step (v), both wet cakes of the precursors are dispersed in demineralised water and slurry of magnesium precursor is heated in step (vi) to 70° C. and temperature of slurry maintained for further 15 minutes.

19. A process as claimed in claim 1 wherein the aluminium slurry is added in step (ix) to magnesium slurry obtained in step (vii) at a temperature below 45° C. prior to crystallisation.

20. A process as claimed in claim 1 wherein the surface modified hydrotalcite slurry is filtered and washed till the pH of washing is about 10 and is dried at 110° C.

21. A process as claimed in claim 1 wherein the amorphous magnesium aluminium complex is prepared at a temperature in the range of 20 to 40° C.

22. A process as claimed in claim 1 wherein the amorphous magnesium aluminium complex is directly crystallized under autogenous pressure in the range 30 to 50 psig without any aging.

23. A process as claimed in claim 1 wherein the amorphous magnesium aluminium complex is crystallized in the time range 2 to 6 hours.

24. A process as claimed in claim 1 wherein the hydrophobic modified surfaces of the hydrotalcite are obtained by addition of stearic acid in the range of 3 to 6% (w/w) to the slurry of crystallized product at a temperature in the range of 75 to 85° C.

25. A process for the preparation of hydrotalcite which comprises, (i) diluting sea bittern with water to obtain a solution with nearly 2% (w/v) magnesium ion concentration and clarifying the bittern by treating with equivalent amount of alum solution and caustic soda solution to precipitate aluminium and magnesium hydroxide in the range of 75–1000 ppm and 200–300 ppm respectively; (ii) separating the sedimented hydroxides and obtaining a clear solution of bittern having magnesium ions concentration in the range of 0.53–0.90 molar; (iii) preparing an aqueous slurry of magnesium precursor by reacting clear bittern obtained in (ii) with alkali carbonate while keeping mole ratio of carbonate ions to magnesium ions in the range of 1.1–1.4 at ambient temperature in stipulated time range of 30–60 minutes; (iv) preparing an aqueous slurry of aluminium precursor by reacting a solution of alum or soluble aluminium salts having not more than 100 ppm of iron with alkali carbonate in 30 minutes under continuous stirring while keeping mole ratio of carbonate ions to aluminium ions in the range of 1.70–1.95; (v) separating two precursors obtained in (iii) and (iv) by filtration, and washing the cakes till washed liquor of magnesium precursor and aluminium precursor showed less than 0.1% (w/v) of chloride and sulphate, respectively; (vi) heating well dispersed aqueous slurry of magnesium precursor to 60–70° C. and adding caustic soda equivalent to 0.90–0.95 of magnesium ion present, in 15 minutes time under continuous stirring; (vii) maintaining the temperature of slurry obtained in (vi) to 60–70° C. for 15 minutes and allowing to cool to nearly 40° C.; (viii) re-dispersing aluminium precursor in 0.05 molar sodium carbonate solution; (ix) adding aqueous aluminium slurry obtained in (viii) to a magnesium slurry obtained in (vii) in 30 minutes keeping ratio of mole of aluminium ions to total moles of aluminium and magnesium ions in the range of 0.28–0.33 and continuing agitation for 30 minutes; (x) crystallizing mixed slurry of 3–5% (w/v on product basis) in the temperature range of 140–150° C. for 4–5 hrs under agitation and cooling to 80° C.; (xi) adding stearic acid of 3–6% (w/w on product basis) to a slurry obtained in (x) with continuous stirring; (xii) agitating the slurry obtained in (xi) while allowing to cool to nearly 55° C., filtering the slurry at nearly 40° C. and washing the cake till filtrate indicated pH of 10; (xiii) drying the said wet cake at 110° C. and pulverizing to obtain hydrophobic hydrotalcite in powder form.

* * * * *